United States Patent [19]

Schultz et al.

[11] Patent Number: 4,861,815
[45] Date of Patent: Aug. 29, 1989

[54] HYDROPHOBICIZED, EASILY-FLOWING THERMOPLASTIC POLYAMIDE CONTAINING MONOEPOXIDE

[75] Inventors: Klaus-Dieter Schultz; Rolf-Volker Meyer; Friedrich Fahnler; Rolf Dhein; Dietrich Michael, all of Krefeld, Fed. Rep. of Germany

[73] Assignee: Bayer Akteingesellschaft, Leverkusen, Fed. Rep. of Germany

[21] Appl. No.: 832,661

[22] Filed: Feb. 25, 1986

[30] Foreign Application Priority Data

Mar. 9, 1985 [DE] Fed. Rep. of Germany ....... 3508531

[51] Int. Cl.$^4$ .............................................. C08L 77/00
[52] U.S. Cl. .................................... 524/114; 525/430
[58] Field of Search ......................... 524/114; 525/430

[56] References Cited

U.S. PATENT DOCUMENTS 3,038,885  6/1962  Best ...................................... 525/430
4,071,486  1/1978  Parker ................................. 524/114

OTHER PUBLICATIONS

*Man–Made Fibers,* vol. 2, Mark et al., Interscience Publishers, New York, New York, pp. 227–237.

*Primary Examiner*—Harold D. Anderson
*Attorney, Agent, or Firm*—Connolly & Hutz

[57] ABSTRACT

Thermoplastic, easily flowing hydrophobic polyamides obtained by incorporation of from 2 to 15% by weight, based on polyamide, of at least one monoepoxide compound corresponding to the following general formula

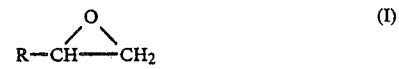

in which
R is a hydrocarbon radical containing at least 4 carbon atoms.

9 Claims, No Drawings

HYDROPHOBICIZED, EASILY-FLOWING THERMOPLASTIC POLYAMIDE CONTAINING MONOEPOXIDE

This invention relates to thermoplastic polyamides which contain special monoepoxide compounds and which are distinguished by improved processability and by reduced water uptake.

The known superior properties of thermoplastic polyamides depend to a large extent upon the hydrogen bridges active between various carbonamide groups. One reason is the hydrophilicity of the carbonamide groups, which causes a distinctly measurable uptake of water both during storage in water and also in a normal atmosphere (cf. for example Kunststoffhandbuch, Vol. VI, Polyamide, Carl-Hanser-Verlag, Munich 1966, pages 458 et seq).

For example, the notched impact strength of polyamide moldings depends to a large extent on their water content. In the anhydrous state, for example after production of the moldings by injection molding, the moldings produced from easily-flowing and, hence, readily processible polyamides of medium molecular weight are relatively sensitive to impact. This applies in particular to moldings of partly crystalline polyamides.

The higher the molecular weight of the polyamide used, the more its toughness increases whereas its processibility rapidly falls to an unsatisfactory level for injection molding.

The toughness of these moldings may be distinctly improved by conditioning with water. However, this is accompanied by softening of the products, as reflected particularly clearly in a drastic reduction in their rigidity, as measured by the E-modulus.

However, high rigidity and adequate toughness of the moldings are essential for numerous applications, particularly for functional and bodywork components in the automotive field.

Since the water uptake of polyamides also depends on their crystallinity, water uptake may be influenced to a slight extent by crystallization-promoting additives and by suitable aftertreatment (for example tempering). However, it is not possible in this way to obtain any significant change in the water uptake of partly crystalline polyamidess, such as PA-6,6 for example.

There are many known processes for increasing the toughness of polyamides even immediately after injection molding, i.e. without the toughness-promoting influence of water. This may be achieved, for example, by incorporation of certain elastomeric polymers. Thus, polyethylenes, copolymers of ethylene with polar comonomers, such as vinylacetate, (meth)acrylates etc. have been proposed as toughness-improving additives along with suitable modified rubbers, such as for example copolymers of butadiene and acrylonitrile.

In all these cases, the toughness of the products is improved. However, since the tendency of the polyamide to absorb up to 10% of water remains unaffected, the high water uptake adversely affects the rigidity which is already reduced by the polymeric toughness modifier in most cases so seriously that the products are unsuitable for technically used articles which have to meet stringent demands in regard to rigidity, toughness and dimensional stability.

Although polyamides of long-chain amide-forming units, i.e. products having lower concentrations of CONH groups in the polymer chains, take up distinctly less wateer so that the corresponding effect on their mechanical properties is weaker, these products nevertheless show inadequate dimensional stability under heat and rigidity for numerous applications and, in addition, are expensive on account of the high price of the stability materials.

It is known that the addition of special substituted phenols (DOS 3 248 329) leads to a distinctly reduced water uptake.

It is also known that the addition of oxycarbonyl isocyanates (DE 30 23 918) to polyamides improves their flow and, hence, facilitates injection molding.

Unfortunately, none of these measures is suitable for the production of polyamides showing improved processability and reduced water uptake.

However, there is a need for polyamides which, even after conditioning, show high dimensional stability under heat, high rigidity, satisfactory toughness, improved dimensional stability compared with PA-6 and PA-6,6 and improved flow.

It has now surprisingly been found that the water uptake of polyamides, preferably partially crystalline polyamides, can be reduced and, at the same time, their flow distinctly increased, enabling polyamides having the above-mentioned combination of properties to be obtained, providing the polyamides are modified with selected monoepoxide compounds.

Accordingly, the present invention relates to easily flowing, hydrophobicized thermoplastic polyamides obtained by incorporation of from 2 to 15% by weight based on the polyamide of at least one monoepoxide compound corresponding to the following general formula

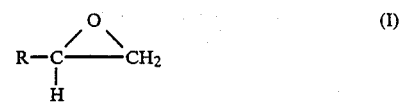

in which

R is a monofunctional hydrocarbon radical containing at least 4 carbon atoms.

R is preferably an optionally substituted and/or branched aliphatic $C_6$–$C_{20}$ and preferably $C_8$–$C_{16}$ radical or araliphatic $C_7$–$C_{20}$ and preferably $C_7$–$C_{16}$ radical. More preferably, R is an optionally branched $C_{10}$–$C_{16}$ alkyl radical.

The monoepoxide compounds used in accordance with the invention for modifying polyamides are known and their production has been described. Mixtures of the epoxide compounds may also be used.

Examples of the monoepoxides suitable for use in accordance with the invention are hexene-1-oxide, octene-1-oxide, decene-1-oxide, dodecene-1-oxide, tetradecene-1-oxide, hexadecene-1-oxide, octadecene-1-oxide, ω-phenylbutene-1-oxide, ω-phenyldodecene oxide.

The monoepoxide compounds are used in quantities of from 2 to 15% by weight and preferably in quantities of from 3 to 10% by weight, based on the polyamide.

Suitable polyamides are linear thermoplastic polycondensates of lactams containing from 6 to 12 carbon atoms and standard polycondensates of diamines and dicarboxylic acids, such as 4,6-, 6,6-, 6,7-, 6,8-, 6,9-, 6,10-, 6,12-, 8,8-, 12,12-polyamide, or polycondensates of aromatic dicarboxylic acids, such as isophthalic acid, terephthalic acid, with diamines, such as hexamethylene diamine, octamethylene diamine, of araliphatic starting materials, such as m- or p-xylylene diamines and adipic acid, suberic acid, sebacic acid, polycondensates based on alicyclic starting materials, such as cyclohexane dicarboxylic acid, cyclohexane diacetic acid, diaminodicyclohexylmethanes, isophorone diamine.

Mixtures of the above-mentioned polyamides or copolyamides obtainable from the above-mentioned monomers or even polyamides modified with elastomers may also ae used. Partially crystalline polyamides are preferably used. The polyamides used should have a relatively viscosity of at least 1.8 (as measured on a 1% solution in m-cresol at 25° C.).

Particular preference is attributed to the 6-, 6,6-, 6,9-6,10-, 6,12-, 11- and 12-polyamides normally used for industrial injection moldings and to copolyamides which consist predominantly of the monomers of the above-mentioned polyamides and which have a relative viscosity, measured as described above, of from 2.5 to 4.0.

To produce the polyamides modified in accordance with the invention, the polyamide component and the epoxide component are mixed with one another, preferably above the melting point of the polyamide. This may be done immediately after production of the polyamide by mixing the epoxides with the melt extruded in the fom of a strand.

The polyamides modified in accordance with the invention are preferably produced by mixing the starting components in standard screw extruders. Suitable screw extruders are both single-screw and twin-screw extruders. Twin-screw extruders are preferably used, although it is possible to use any other mixing machine suitable for plasticizing plastics.

Stabilizers, mold release agents, lubricants, crystallization accelerators, plasticizers, pigments, dyes, reinforcing materials and/or fillers, such as glass fibers or asbestos, may also be incorporated in the quick-flowinyg, hydrophobicized polyamides according to the invention for use as thermoplastic molding compositions, these additives preferably being incorporated at the same time as the epoxide modifier.

The polyamides modified in accordance with the invention are particularly easily-flowing products which may readily be processed in standard injection-molding machins to form moldings which have a distinctly reduced water uptake compared with unmodified comparisonproducts for the same favorable performance properties typical of polyamides.

The polyamide molding compositions are particularly suitable for the production by injection molding of moldings of the type which require long flow paths. By virtue of the reduced water uptake, these moldings are suitable for automotive components, the glass fiber-reinforced products being particularly suitable by virtue of their improved dimensional stability.

EXAMPLE 1

94% by weight of a polyamide-6 having a relative viscosity of 2.8, as measured on a 1% solution in m-cresol, and 6% by weight of dodecene-1-oxide are simultaneously introduced through a weigh feeder and a metering pump, respectively, into a type ZSK 53 twin-screw extruder and extruded at 260° C./90 r.p.m. The homogeneous melt is extruded as a strand into a water bath, granulated and dried at 80° to 100° C. to a water content of around 0.1% by weight. The product has a relative viscosity of 2.5.

Moldings from the product and unmodified comparison samples are stored for prolonged periods in a normal atmosphere and under water. The polyamide modified in accordance with the invention takes up distinctly less water under any conditions. At the same time, flow—as a measure of injection moldability—is distinctly improved from 79 cm to a flow length*) of 95 cm. The test results are shown in Table 1.

*The flow length is a measure of the flow of a product and hence of its processability; a longer flow length means better flow and hence shorter injection cycles. The flow length is determined as follows: the sample to be tested is injected under a pressure of 72 bar into a special mold kept at 90° C. in an injection molding machine having a barrel temperature of 260° C. Particularly free-flowing materials are able to fill the mold under these conditions, so that a 100 cm long spiral may subsequently be removed therefrom. Less free-flowing materials only partly fill the mold under the described conditions, so that it is only possible to obtain spirals less than 100 cm in length on account of the premeature solidification of the melt. The flow length is the length in cm which is reproduced 5 times.

EXAMPLES 2 TO 4

As in Example 1, 6% by weight of dodecene-1-oxide are incorporated in various polyamides and the products obtained are tested as described in Example 1. The composition of the modified polyamides and theirproperties are shown in Table 1.

EXAMPLES 5 TO 10

The properties of products obtained with various monoepoxides, but with the same polyamide component are shown in Table 2. Moldings produced from the product and unmodified comparison moldings are stored for prolonged periods in a normal atmosphere and under water. The polyamide modified in accordance with the invention takes up distinctly less water under any conditions.

TABLE 1

Modification of polyamides with dodecene-1-oxide

| Example No. | Polyamide used | | | | Additive as in Example 1, parts by weight | Product properties of the modified polyamide | | | | |
|---|---|---|---|---|---|---|---|---|---|---|
| | Type | $\eta_{rel}$ | Polyamide used parts by weight | Flow length (cm) | % by weight $H_2O^1$ uptake | | $\eta_{rel}$ | flow length (cm) | % by weight $H_2O^1$ uptake | % increase in flow length | % reduced $H_2O^1$ uptake |
| 1 | PA-6 | 2.8 | 94 | 79 | 8.37 | 6 | 2.5 | 95 | 6.68 | 20 | 20 |
| 2 | PA-6 | 3.0 | 94 | 73 | 7.79 | 6 | 2.6 | 100 | 5.46 | 37 | 30 |
| 3 | PA-6,6 | 3.0 | 94 | 65 | 2.96 | 6 | 2.8 | 75 | 2.37 | 15 | 20 |
| 4 | PA-6,9 | 3.5 | 94 | 45 | 2.62 | 6 | 3.2 | 56 | 2.18 | 24 | 17 |

[1]% by weight $H_2O$ uptake of injection-molded round plates after storage in water for 42 days at 20° C.

TABLE 2

Modification of polyamide-6 ($\eta_{rel}$ = 2.8, flow length 79 cm, water uptake[1] 8.37%) with various epoxides

| Example No. | Additive | Quantity (parts by weight) | $\eta_{rel}$ | flow length (cm) | % by weight $H_2O$[1] uptake | % increase in flow length | % reduced $H_2O$ uptake |
|---|---|---|---|---|---|---|---|
| 5 | decene-1-oxide | 6 | 2.6 | 95 | 6.49 | 20 | 24 |
| 6 | dodecene-1-oxide | 3 | 2.5 | 85 | 7.09 | 8 | 15 |
| 7 | dodecene-1-oxide | 6 | 2.5 | 95 | 6.68 | 20 | 20 |
| 8 | dodecene-1-oxide | 10 | 2.5 | 99 | 6.44 | 25 | 23 |
| 9 | tetradecene-1-oxide | 6 | 2.5 | 87 | 7.05 | 10 | 16 |
| 10 | hexadecene-1-oxide | 6 | 2.6 | 85 | 6.90 | 8 | 18 |

[1] % by weight $H_2O$ uptake of injection-molded round plates after storage in water for 42 days at 20° C.

We claim:

1. An easily flowing, hydrophobic, thermoplastic polyamide composition which comprises (i) linear thermoplastic polycondensate of lactam containing 6 to 12 carbon atoms, a polycondensate of a diamine and a dicarboxylic acid, or a mixture of both wherein the polycondensate has a relative viscosity of at least 1.8 as measured in a 1% solution in m-cresol at 25° C. and (ii) from 2 to 15% by weight, based on (i), of at least one monoepoxide corresponding to the formula:

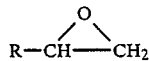

wherein R represents a hydrocarbon moiety containing at least 4 carbon atoms.

2. A polyamide composition as claimed in claim 1, wherein from 3 to 10% by weight of monoepoxide is present.

3. A polyamide composition as claimed in claim 1, wherein R represents and unsubstituted or substituted $C_6$–$C_{20}$ aliphatic or $C_7$–$C_{20}$ araliphatic radical.

4. A polyamide composition as claimed in claim 3 wherein R represents an unsubstituted or substituted $C_8$–$C_{16}$ aliphatic or $C_7$–$C_{16}$ araliphatic radical.

5. A polyamide composition as claimed in claim 4 wherein R represents an unsubstituted or substituted $C_{10}$–$C_{16}$ alkyl radical.

6. A polyamide composition as claimed in claim 1, wherein the epoxide compound is hexene-1-oxide, octene-1-oxide, decene-1-oxide, dodecene-1-oxide, tetradecene-1-oxide, hexadecene-1-oxide, octadecene-1-oxide, ω-phenylbutene-1-oxide or ω-phenyl-dodecene oxide.

7. Moulded article produced from the composition as claimed in claim 1.

8. A polyamide composition according to claim 1 wherein (i) is a polycondensate of a diamine and dicarboxylic acid
    wherein the diamine is hexamethylene diamine, octamethylene diamine, isophorone diamine, diaminodicyclohexyl methane, or xylene diamine; and
    wherein the dicarboxylic acid is isophthalic acid, terephthalic acid, adipic acid, suberic acid, sebacic acid, cyclohexane dicarboxylic acid, or cyclohexane diacetic acid.

9. A polyamide composition according to claim 1 wherein (i) is 6-, 6,6-, 6,9-, 6,10-, 6,12-, 11-, 12-polyamide or a copolyamide consisting predominately of the monomers of the above-mentioned polyamides and wherein (i) has a relative viscosity of 2.5 to 4.0 as measured in a 1% solution in m-cresol at 25° C.

* * * * *